United States Patent
Nakanishi et al.

(10) Patent No.: US 10,083,793 B2
(45) Date of Patent: Sep. 25, 2018

(54) METAL POWDER, METHOD FOR PRODUCING THE SAME, CONDUCTIVE PASTE INCLUDING METAL POWDER, AND MULTILAYER CERAMIC ELECTRONIC COMPONENT

(71) Applicant: MURATA MANUFACTURING CO., LTD., Nagaokakyo-shi, Kyoto-fu (JP)

(72) Inventors: Toru Nakanishi, Nagaokakyo (JP); Naoaki Ogata, Nagaokakyo (JP)

(73) Assignee: MURATA MANUFACTURING CO., LTD., Nagaokakyo-shi, Kyoto-fu (JP)

(*) Notice: Subject to any disclaimer, the term of this patent is extended or adjusted under 35 U.S.C. 154(b) by 152 days.

(21) Appl. No.: 14/868,081

(22) Filed: Sep. 28, 2015

(65) Prior Publication Data

US 2016/0020023 A1 Jan. 21, 2016

Related U.S. Application Data

(63) Continuation of application No. PCT/JP2014/055983, filed on Mar. 7, 2014.

(30) Foreign Application Priority Data

Apr. 5, 2013 (JP) .................................. 2013-079959

(51) Int. Cl.
*B22F 9/24* (2006.01)
*H01G 4/008* (2006.01)
(Continued)

(52) U.S. Cl.
CPC ........... *H01G 4/008* (2013.01); *B22F 1/0003* (2013.01); *B22F 1/0018* (2013.01); *B22F 1/02* (2013.01);
(Continued)

(58) Field of Classification Search
None
See application file for complete search history.

(56) References Cited

U.S. PATENT DOCUMENTS

| 4,010,025 A | 3/1977 | Fraioli et al. |
| 6,007,743 A | 12/1999 | Asada et al. |

(Continued)

FOREIGN PATENT DOCUMENTS

| JP | H11-124602 A | 5/1999 |
| JP | 2000083901 A | 2/2000 |
| JP | 2003-129106 A | 5/2003 |
| JP | 3475749 B2 | 12/2003 |
| JP | 2006-004675 A | 1/2006 |
| JP | 2010-018880 A | 1/2010 |

(Continued)

OTHER PUBLICATIONS

International Search issued for PCT/JP2014/055983, dated May 13, 2014.

*Primary Examiner* — George Wyszomierski
(74) *Attorney, Agent, or Firm* — Arent Fox LLP (57) ABSTRACT

A method for producing a metal powder that includes a first step of uniformly arranging a metal compound on a metal particle, and a second step of converting the metal compound uniformly arranged on the metal particle into a complex metal compound. In the first step, a solution that contains at least one metal element and at least one group 4 element different from the metal element is prepared, the solution being adjusted to have a pH of 5 or less. The prepared solution is mixed with a reductant solution to coprecipitate the metal and the metal compound, thereby producing a slurry that contains a metal powder containing the metal combined with the metal compound. In the second step, a solution or a powder containing at least one second metal element is added to the slurry to convert the metal compound into the complex metal compound.

17 Claims, 3 Drawing Sheets

(51) Int. Cl.
- *H01G 4/30* (2006.01)
- *H01B 1/22* (2006.01)
- *H01B 1/02* (2006.01)
- *B22F 1/02* (2006.01)
- *B22F 1/00* (2006.01)
- *C09D 5/24* (2006.01)
- *H01G 4/012* (2006.01)
- *H01G 4/12* (2006.01)

(52) U.S. Cl.
CPC ............... *B22F 9/24* (2013.01); *C09D 5/24* (2013.01); *H01B 1/02* (2013.01); *H01B 1/22* (2013.01); *H01G 4/0085* (2013.01); *H01G 4/012* (2013.01); *H01G 4/30* (2013.01); *H01G 4/12* (2013.01)

(56) References Cited

U.S. PATENT DOCUMENTS

| | | | |
|---|---|---|---|
| 7,407,606 B2 * | 8/2008 | Chiba | C01G 23/00 106/436 |
| 7,470,306 B2 * | 12/2008 | Inazawa | B22F 9/24 75/345 |
| 8,052,954 B2 * | 11/2011 | Kurozumi | C01G 23/006 423/598 |
| 2002/0055002 A1 | 5/2002 | Toshima et al. | |

FOREIGN PATENT DOCUMENTS

| JP | 2012-102351 A | 5/2012 |
|---|---|---|
| KR | 1999088656 A | 12/1999 |

* cited by examiner

FIG. 1

METAL POWDER, METHOD FOR PRODUCING THE SAME, CONDUCTIVE PASTE INCLUDING METAL POWDER, AND MULTILAYER CERAMIC ELECTRONIC COMPONENT

CROSS REFERENCE TO RELATED APPLICATIONS

The present application is a continuation of International application No. PCT/JP2014/055983, filed Mar. 7, 2014, which claims priority to Japanese Patent Application No. 2013-079959, filed Apr. 5, 2013, the entire contents of each of which are incorporated herein by reference.

FIELD OF THE INVENTION

The present invention relates to a metal powder, a method for producing the metal powder, a conductive paste including the metal powder, and a multilayer ceramic electronic component. In particular, the present invention relates to a metal powder and so forth used for multilayer ceramic electronic components, such as multilayer ceramic capacitors.

BACKGROUND OF THE INVENTION

Hitherto, a multilayer ceramic capacitor has been produced by stacking electrode layers mainly composed of a metal powder and dielectric layers and subjecting the resulting stack to a firing step into one piece. Specifically, dielectric materials are mixed together to form a paste. The paste is formed into sheets. A conductive paste to be formed into electrode layers is applied to the dielectric sheets. The sheets are stacked and pressure-bonded. The resulting stack is sintered to combine the dielectric layers and the electrode layers into one piece, thereby producing a multilayer ceramic capacitor. Recent trends toward miniaturization and higher capacitance of multilayer ceramic capacitors have required electrode layers each having a smaller thickness. To produce such multilayer ceramic capacitors, metal powders for conductive pastes are required to have finer particles and high dispersibility.

Metal powders for conductive pastes used in multilayer ceramic capacitors are also required to have resistance to sintering. Sintering temperatures of metal powders used for conductive pastes are about 400° C. In contrast, sintering temperatures of dielectrics are about 1000° C. In firing steps for multilayer ceramic capacitors, both of dielectric layers and electrode layers need to be sintered. Thus, they are fired at sintering temperatures of dielectric layers that are sintered at higher temperatures. However, as described above, a difference in sintering shrinkage behavior between dielectric layers and electrode layers due to a difference in sintering behavior therebetween causes cracking in capacitors and a reduction in coverage. Thus, for the purpose of bringing the sintering shrinkage behavior of electrode layers closer to that of dielectric layers, fine dielectric particles are incorporated into electrode layers to inhibit the sintering of metal powders.

Fine dielectric particles incorporated into the electrode layers have at least two effects of inhibiting sintering during sintering: A first effect is one in which the fine dielectric particles inhibit contact between metal particles, necking between the metal particles, and sintering of the electrodes. A second effect is one in which the fine dielectric particles are deposited at the triple point of the metal particles (crystals) during the sintering of a metal powder, pin the metal particles, and inhibit the sintering of the electrodes. A more uniform dispersion of the fine dielectric particles in the metal powder further improves the effect of inhibiting the necking of the metal particles and the effect of pinning the metal particles, thereby inhibiting the sintering the metal powder. For this reason, a method for producing a metal powder containing fine dielectric particles uniformly dispersed therein is required.

Figure 2:
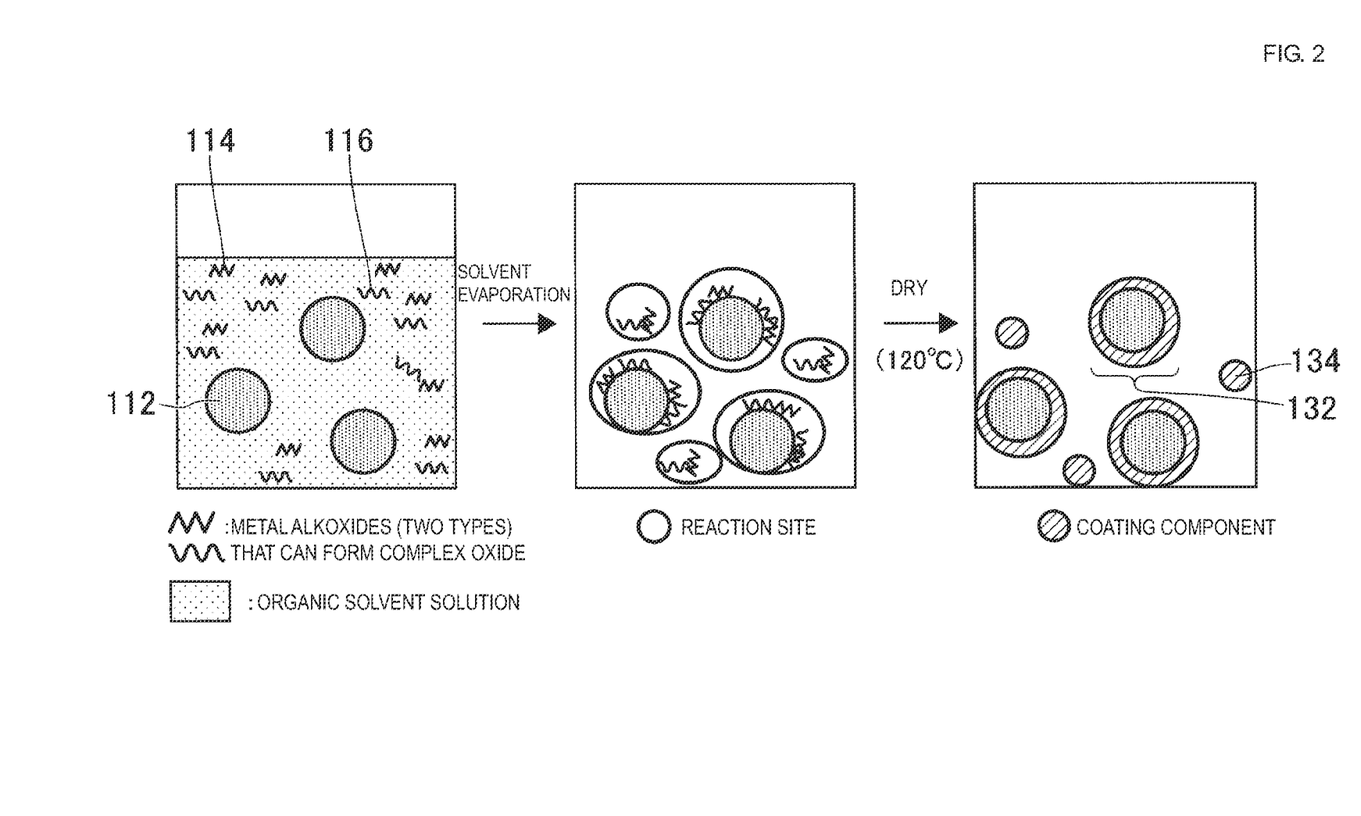
FIG. 2 is a schematic drawing according to an embodiment of Patent Document 1.

Japanese Unexamined Patent Application Publication No. 2006-4675 (hereinafter, referred to as "Patent Document 1") discloses a production method in which, for the purpose of bringing the thermal shrinkage characteristics of a Ni powder closer to those of dielectric ceramic layers and producing a conductive particle powder having excellent oxidation resistance and dispersibility in a conductive coating, an organic solvent in a slurry prepared by the addition of metal alkoxides 114 and 116 to a slurry of a Ni powder 112 dispersed in an organic solvent is evaporated and in which drying is performed to allow the alkoxides 114 and 116 to react during the drying (see FIG. 2).

However, in the production method described in Patent Document 1, a reaction occurs during the drying at a position other than the vicinity of the Ni powder 112 in a solution, in addition to the vicinity of the Ni powder 112, so that a metal compound that is not combined with the metal powder is formed. A metal powder 132 in which a metal and a complex metal compound are combined together is not efficiently produced. Furthermore, in the production method, the metal alkoxides 114 and 116 are used, and so the organic solvent must be used. It is not easy to handle the reaction mixture. It is necessary to take high-cost measures against explosions.

Figure 3:
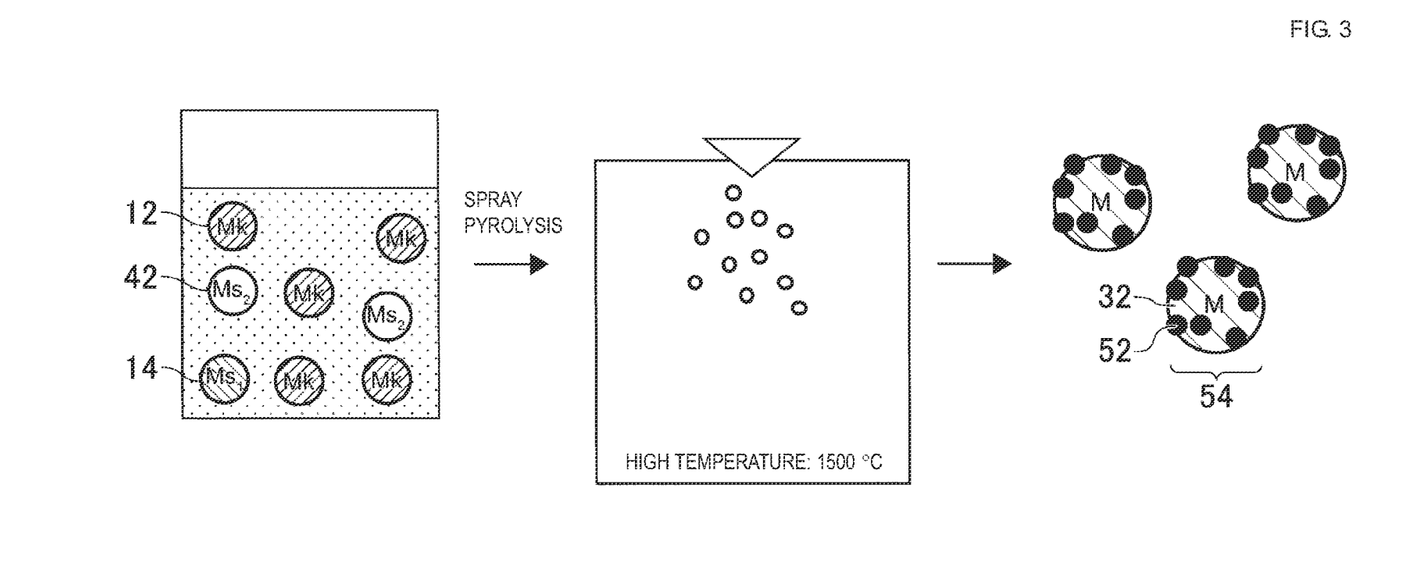
FIG. 3 is a schematic drawing according to an embodiment of Patent Document 2.

Japanese Patent No. 3475749 (hereinafter, referred to as "Patent Document 2") discloses, for the purpose of effectively inhibiting the sintering of a Ni powder at a low temperature and producing a high-conductivity conductive film even at a small film thickness, a method in which a uniform solution containing a pyrolytic Ni compound and a pyrolytic compound (Ca, Ba, Ti, or Zr) to be converted into an oxide is prepared and heated at a decomposition temperature or higher in a reducing atmosphere. Specifically, a Ni powder including a complex oxide layer is produced at 1500° C. in a furnace by a spray pyrolysis method (see FIG. 3).

However, in the production method disclosed in Patent Document 2, heat treatment is performed at a high temperature during the production to allow the aggregation and coalescence of the Ni powder to proceed. Thus, the dispersibility of the complex oxide in the Ni powder is not sufficient.

Patent Document 1: Japanese Unexamined Patent Application Publication No. 2006-4675
Patent Document 2: Japanese Patent No. 3475749

SUMMARY OF THE INVENTION

It is an object of the present invention to provide a method for efficiently producing a metal powder in which a metal and a complex metal compound are uniformly dispersed.

According to the present invention, a method for producing a metal powder containing a metal combined with a complex metal compound includes a first step including preparing a first solution that contains at least one first metal element serving as the element of the metal and at least one group 4 element different from the first metal element, the first solution being adjusted to have a pH of 5 or less, mixing the first solution with a reductant solution to coprecipitate the metal and a metal compound, and producing a slurry that contains a metal powder containing the metal combined with the metal compound by the coprecipitation, the metal compound containing the group 4 element to be converted into the complex metal compound; and a second step including preparing a second solution or a powder containing at least one second metal element in order to convert the metal compound into the complex metal compound; and adding the second solution or the powder to the slurry to convert the metal compound into the complex metal compound to produce the metal powder containing the metal combined with the complex metal compound.

In the present invention, the separated steps permits reactive sites in both reactions for the formation of an oxide and the formation of a complex oxide to be limited to only particle portions, thereby efficiently producing the metal powder uniformly combined with a complex oxide. The metal of the group 4 element is easily combined with the metal compound. However, the metal ions of the group 4 element are stabilized by adjusting the pH to 5 or less. A compound containing the group 4 element is not deposited in a stage before mixing with the reductant solution, thereby resulting in the uniform powder of the formed metal uniformly combined with the complex metal compound.

In the production method according to the present invention, the metal compound coprecipitated in the first step is present in the interior as well as on the surface of the metal coprecipitated in the first step, thus enhancing the effect of inhibiting the sintering.

In the production method according to the present invention, the molar ratio of the component of the complex metal compound to the component of the metal in the metal powder containing the metal combined with the complex metal compound is preferably 0.1% by mole to 10% by mole. The limitation of the molar ratio as described above enhances the effect of inhibiting the sintering.

In the production method according to the present invention, in the metal and the metal compound coprecipitated in the first step, the metal preferably contains the at least one first element selected from Ni, Ag, Cu, and Pd.

In the production method according to the present invention, a reductant in the reductant solution preferably contains at least one selected from sodium borohydride, titanium trichloride, hydrazine, sodium hypophosphite, sodium phosphite, aldehyde, ascorbic acid, citric acid, hydrogen gas, alcohols, and polyhydric alcohols. These reductants are capable of reducing a metal and do not reduce a substance that will be deposited in the form of a metal compound. Thus, these reductants are suited to form a metal and a complex metal compound.

In the production method according to the present invention, the second solution or the powder added in the second step preferably contains the at least one second metal element selected from Mg, Ca, Sr, and Ba. These metal elements are readily combined with the metal compound. The metal compound is ultimately converted into an oxide after firing. At that time, the group 2 elements used in dielectric compositions are less likely to cause composition deviation.

The reaction temperature in the second step is preferably in the range of 40° C. to 300° C. at which the complex metal compound is readily formed.

The foregoing production method is more suitable when the metal powder containing the metal combined with the complex metal compound produced in the second step is controlled to have a particle diameter of 1 μm or less and the complex metal compound is controlled to have a particle diameter of 0.2 μm or less. To achieve a smaller thickness of layers in multilayer ceramic capacitors, the metal powder used for a conductive paste preferably has a smaller particle diameter. When the metal powder has a particle diameter of 1 μm or more, high coverage is obtained even without inhibiting the sintering using the complex metal compound, so that there is no need to inhibit the sintering. When the powder of the metal compound has a particle diameter of 0.2 μm or more, it is difficult to uniformly disperse the powder of the metal compound in the metal powder, thereby reducing the effect of inhibiting the sintering.

In the foregoing production method, the first solution whose pH is adjusted to 5 or less in the first step, the reductant solution, or the second solution or the powder added in the second step preferably contains at least one element selected from Mg, Ca, Sr, Y, La, Nd, Sm, Eu, Gd, Tb, Dy, Ho, Er, Yb, Sc, V, Nb, Ta, Cr, Mo, W, Mn, Fe, Ru, Co, Al, Ga, and Si.

To adjust the characteristics of capacitors, an alkaline-earth element or a rare-earth element is often added to dielectric layers. The addition of the element to the metal compound is much less likely to cause the composition deviation. Furthermore, these elements have high sintering temperatures, thereby improving the effect of inhibiting the sintering.

A metal powder according to the present invention is the metal powder produced by any production method described above.

A conductive paste according to the present invention contains the metal powder produced by any production method described above, and an organic vehicle.

A multilayer ceramic electronic component according to the present invention includes a plurality of ceramic layers and an inner electrode layer arranged between the plurality of ceramic layers, the inner electrode layer being formed of a sintered body made from the conductive paste described above.

In the production method according to the present invention, the separated steps permits the reactive sites in both reactions for the formation of the oxide and the formation of the complex oxide to be limited to only the particle portions, thereby producing the metal powder uniformly combined with the complex oxide. The metal of the group 4 element is easily combined with the metal compound. However, the metal ions of the group 4 element are stabilized by adjusting the pH to 5 or less. A compound containing the group 4 element is not deposited in the stage before mixing with the reductant solution, thereby resulting in the uniform powder of the formed metal uniformly combined with the complex metal compound.

In the production method according to the present invention, water and so forth may be used as a solvent in place of a metal alkoxide, thus leading to easy handling, eliminating the need for measures against explosions, and achieving low costs.

In the production method according to the present invention, the complex metal compound is more uniformly dispersed in the metal powder, thereby improving the effect of inhibiting the sintering of the metal powder. Thus, when the conductive paste containing the metal powder is used to form electrode layers of multilayer ceramic capacitors, the sintering shrinkage behavior of the electrode layers is close to that of dielectric layers, reducing the delamination of capacitors.

DETAILED DESCRIPTION OF THE PREFERRED EMBODIMENTS

A production method according to the present invention relates to a metal powder containing a metal combined with a complex metal compound that is uniformly present on each metal particle. A method for producing a metal powder according to an embodiment of the present invention will be described below with reference to FIG. 1.

(First Step)

Figure 1:
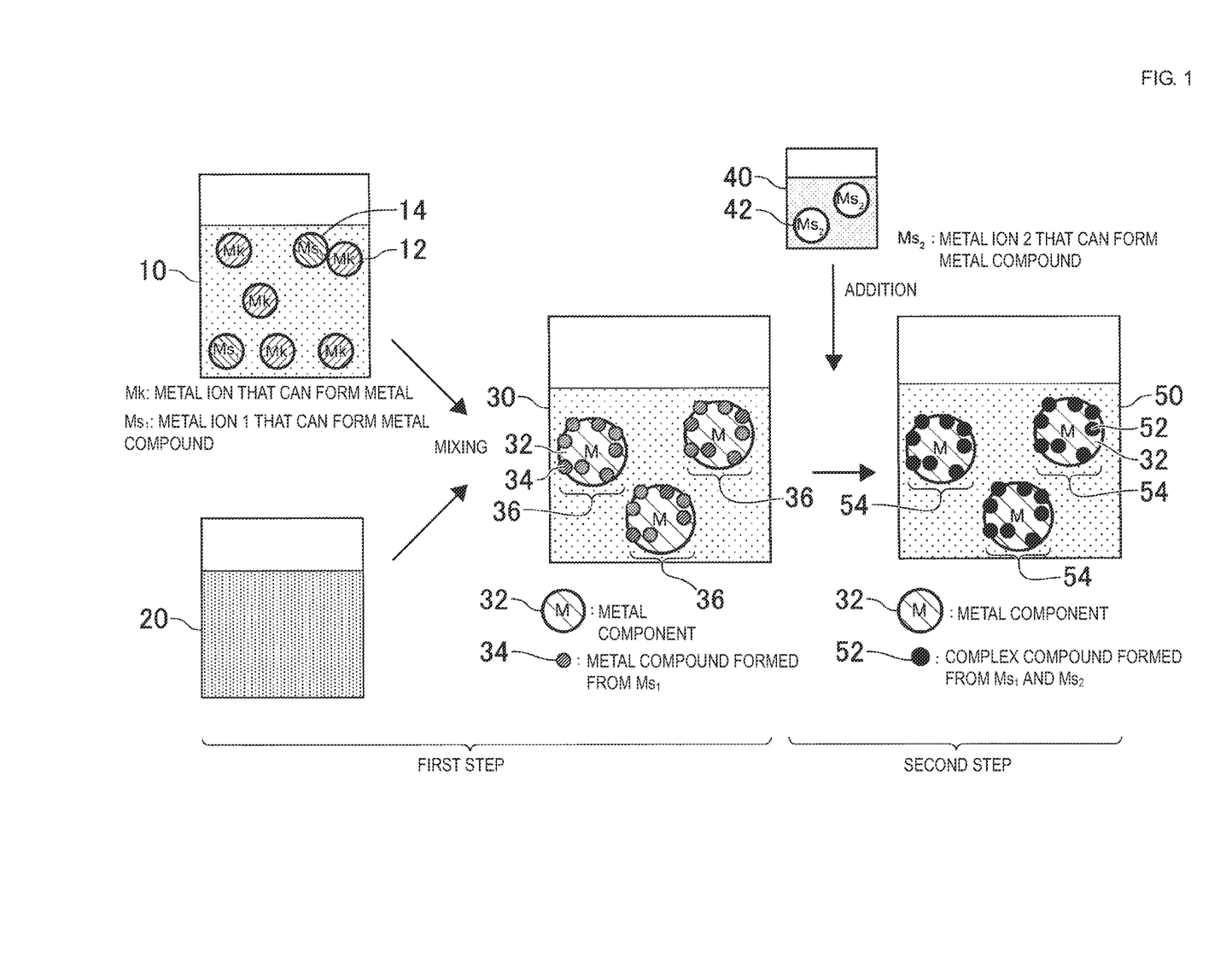
FIG. 1 is a schematic drawing according to an embodiment of the present invention.

A metal salt solution 10 containing metal ions 12 (for example, Ni ions) and metal ions 14 (for example, Ti ions) of at least one of the group 4 elements is prepared, the metal ions 14 being different from the metal ions 12, and the metal salt solution 10 being adjusted so as to have a pH of 5 or less. The metal ions 12 dissolved in the metal salt solution may be metal ions of different types. The element of the metal ions 12 may be, for example, Ni, Ag, Cu, or Pd.

A reductant solution 20 to be mixed with the metal salt solution 10 is prepared. A reductant in the reductant solution 20 may contain at least one selected from, for example, sodium borohydride, titanium trichloride, hydrazine, sodium hypophosphite, sodium phosphite, aldehydes, ascorbic acid, citric acid, hydrogen gas, alcohols, and polyhydric alcohols.

The metal salt solution 10 and the reductant solution 20 prepared are mixed together to coprecipitate a metal 32 (for example, Ni) and a metal compound 34 (for example, $TiO_2$), thereby providing particles 36 of a metal powder (metal-metal compound composite powder) containing the metal 32 combined with the metal compound 34.

(Second Step)

A solution 40 or powder containing at least one metal element 42 (for example, Ba) to be combined with the metal compound 34 is added to a solution containing the metal powder 36 prepared in the first step. The solution or powder added preferably contains metal elements of Mg, Ca, Sr, and Ba.

Ions 42 of the metal element added and the metal compound 34 combined with the metal 32 are converted into a complex metal compound. Washing and drying are performed to provide a metal powder 54 containing the metal 32 (for example, Ni) combined with the complex metal compound 52 (for example, $BaTiO_3$). The reaction temperature in the step is preferably in the range of 40° C. to 300° C.

The production method according to the present invention includes the separated steps: the first step of uniformly arranging the metal compound 34 on the metal particles 32; and the second step of converting the metal compound 34 uniformly arranged on the metal particles 32 into a complex metal compound. The separated steps permits reactive sites in both reactions for the formation of the metal compound 34 and the formation of the complex metal compound to be limited to only portions of the metal particles 32. This inhibits the formation of the metal compound 34 that is not combined with the metal 32, thereby efficiently providing the metal powder that is uniformly converted into a complex oxide.

In the first step of the production method according to the present invention, the reduction reaction of the metal ions 12 that can form the metal 32 and the hydrolysis reaction of the metal ions 14 that can form the metal compound 34 are allowed to proceed simultaneously by mixing the solution 10 containing the metal ions 12 that can form the metal 32 and the metal ions 14 that can form the metal compound 34 with the alkali-containing reductant solution 20.

To produce the metal powder 54 containing the metal 32 combined with the complex metal compound 52 that is uniformly present on each of the metal particles 32, desirably, the metal ions 12 that can form the metal 32 and the metal ions 14 that can form the metal compound 34 are uniformly present in the solution as much as possible. For this reason, in the present invention, the metal ions 12 that can form the metal 32 and the metal ions 14 that can form the metal compound 34 are allowed to be uniformly present in the solution at an ionic level by adjusting the pH of the metal salt solution 10 containing the metal ions 12 that can form the metal 32 and the metal ions 14 that can form the metal compound 34, thereby producing the metal powder containing the metal 32 combined with the metal compound 34 that more uniformly present in the metal powder.

Examples of the method for producing a metal-complex metal compound composite powder according to the present invention and comparative examples in comparison with the production method of the present invention will be described below.

Example 1-1

First Step

In 150 ml of deionized water, 45 g of nickel chloride hexahydrate was dissolved. A titanium(IV) chloride solution serving as a metal compound solution and 0.1% by mole hydrochloric acid were added to the resulting solution in such a manner that the solution had a pH of 1 and that the molar ratio of a complex metal compound to a metal component was 2% by mole, thereby preparing a metal salt solution. Here, the metal compound solution added, i.e., the titanium(IV) chloride solution, only needs to be dissolved in the metal salt solution after the addition. The metal compound solution is not limited to a solution of a chloride and may be a solution of a sulfate, hydroxide, or a carbonate.

To adjust the particle diameter, a 0.1% by mole aqueous solution of copper(II) chloride was added thereto to the extent that Cu/Ni (% by weight) was in the range of 0 to 100 ppm in such a manner that the metal-complex metal compound composite powder formed had a particle diameter of 0.3 μm. Then 90 g of hydrazine hydrate (reductant) was mixed with 22.5 g of sodium hydroxide to prepare a reductant solution.

The solution temperature of both of the reductant solution and the metal salt solution was adjusted to 80° C. The metal salt solution was added to the reductant solution at a feed rate of 100 ml/min with the reductant solution stirred at 200 rpm. A metal (Ni) and a metal compound ($TiO_2$) were coprecipitated by a liquid phase reaction to produce a metal-metal compound composite powder. Thereafter, the resulting composite powder was washed with deionized water by decantation.

Second Step $Ba(OH)_2$ serving as a compound newly added was added to the solution prepared in the first step to convert the metal compound ($TiO_2$) in the metal-metal compound composite powder prepared in the first step into a complex metal compound. The metal powder containing the complex metal compound was washed and dried to provide a metal powder containing the metal combined with the complex metal compound, i.e., a metal powder containing Ni combined with $BaTiO_3$. Here, $Ba(OH)_2$ may be added in an amount equal to or larger than the molar ratio (% by mole) of the complex metal compound to the metal component.

Example 1-2

In Example 1-2, the metal salt solution prepared in the first step was adjusted so as to have a pH of 2. Other points in Example 1-2 were the same as those in Example 1-1.

Example 1-3

In Example 1-3, the metal salt solution prepared in the first step was adjusted so as to have a pH of 5. Other points in Example 1-3 were the same as those in Example 1-1.

Example 1-4

In Example 1-4, in the first step, 45 g of nickel chloride hexahydrate was dissolved in 150 ml of deionized water. A titanium(IV) chloride solution and a zirconium chloride solution, serving as metal compound solutions, and 0.1% by mole hydrochloric acid were added to the resulting solution in such a manner that the solution had a pH of 2 and that the molar ratio of a complex metal compound to a metal component was 1% by mole, thereby preparing a metal salt solution. $Ba(OH)_2$ and $Ca(OH)_2$, serving as compounds added in the second step, were added to convert the metal compound ($TiO_2$ and $ZrO_2$) into complex metal compounds. Other points in Example 1-4 were the same as those in Example 1-2.

Example 1-5

In Example 1-5, a mixed solution of deionized water and ethanol in a volume ratio of 1:1 was used as a solvent in which nickel chloride hexahydrate was dissolved. Other points in Example 1-5 were the same as those in Example 1-2.

The method in which the element required to form a complex metal compound is newly added in the second step as described in Examples 1-1 to 1-5 is expressed as "method 1" in the "Synthesis method" column in Table 1 described below.

Comparative Example 1-1

In 150 ml of deionized water, 45 g of nickel chloride hexahydrate was dissolved to prepare a metal salt solution with a pH of 5. Then 90 g of hydrazine hydrate (reductant) was mixed with 22.5 g of sodium hydroxide to prepare a reductant solution. The solution temperature of both of the reductant solution and the metal salt solution was adjusted to 80° C. The metal salt solution was added to the reductant solution at a feed rate of 100 ml/min with the reductant solution stirred at 200 rpm. A metal powder of Ni was produced by a liquid phase reaction.

The method in which the second step in Example 1-1 is omitted is expressed as "method 2" in the "Synthesis method" column in Table 1 described below.

Comparative Example 1-2

In 150 ml of ethanol, 45 g of nickel chloride hexahydrate and 0.00254 g of copper(I) chloride were dissolved. A titanium tetraisopropoxide solution was added to the resulting solution in a proportion of 2 mol of Ti to 100 mol of Ni to prepare a metal salt solution. The pH was not measured because of the organic solvent. Barium hydroxide was added to a solution containing 22.5 g of sodium hydroxide and 90 g of hydrazine hydrate (reductant) in a proportion of 2 mol of Ba to 100 mol of Ni, thereby preparing a reductant solution. The solution temperature of both of the reductant solution and the metal salt solution was adjusted to 42° C. The metal solution was added to the reductant solution at a feed rate of 100 ml/min with the reductant solution stirred at 350 rpm. Ni and $BaTiO_3$ were coprecipitated in a liquid phase, thereby producing a metal-complex metal compound composite powder.

The method in which the element added in the second step in Example 1-1 is added in the first step in place of the second step is expressed as "method 3" in the "Synthesis method" column in Table 1 described below.

Comparative Example 1-3

In Comparative Example 1-3, the metal salt solution prepared in the first step in Example 1-1 was adjusted so as to have a pH of 7. Other points in Comparative Example 1-3 were the same as those in Example 1-1.

Conductive pastes were produced using the metal-metal compound composite powders prepared in the examples (Examples 1-1 to 1-5) and the comparative examples (Comparative Examples 1-1 to 1-3). Multilayer ceramic capacitors were produced using the conductive pastes.

Each of the conductive pastes was produced by mixing a corresponding one of the metal-metal compound composite powders prepared in the examples and comparative examples, a resin, a dispersing agent, and a solvent together and then performing dispersion treatment with a three-roll mill, a sand mill, or a pot mill into a paste form.

The conductive paste was disposed on ceramic green sheets. The plural sheets were laminated and fired to produce a multilayer ceramic capacitor. The firing temperature was 1000° C. to 1200° C. One of $MgTiO_3$, $MgZrO_3$, $CaTiO_3$, $CaZrO_3$, $BaTiO_3$, $BaZrO_3$, $SrTiO_3$, and $SrZrO_3$ serving as base materials, a sintering aid, such as $SiO_2$, a rare-earth element, an alkaline-earth element, Mn, V, and so forth to adjust the electrical characteristics, a resin, and a solvent were mixed together to prepare a slurry, and then the slurry was formed into the ceramic green sheets. The ceramic green sheets form dielectric layers of the multilayer ceramic capacitor. The conductive paste forms inner electrode layers of the multilayer ceramic capacitor. The multilayer ceramic capacitor produced has a size of 1.0 mm×0.5 mm. The number of electrodes was 100 layers.

(Measurement Method)

Regarding the conductive pastes and the multilayer ceramic capacitors produced with the metal-metal compound composite powders prepared in the examples (Examples 1-1 to 1-5) and comparative examples (Comparative Examples 1-1 to 1-3), the characteristics of the powders produced by the production methods were measured by methods described below.

(1) Measurement of Molar Ratio (% by Mole) of Complex Metal Compound to Metal Component The metal-complex compound composite powders were subjected to composition analysis by ICP, thereby measuring the molar ratios of the metals and the metal compounds. The molar ratios of the complex metal compound components to the metal components were calculated from the values.

(2) Study of Coverage

Each of the multilayer ceramic capacitors was delaminated at the interfaces between the electrode layers and the dielectric layers. The proportions of metal portions on the exposed surfaces were calculated as coverage. As described above, the difference in sintering shrinkage behavior between the dielectric layers and the electrode layers of the multilayer ceramic capacitor causes a reduction in coverage. Thus, high coverage indicates that the sintering of the electrode layers of the multilayer ceramic capacitor is inhibited and the sintering behavior of the dielectric layers is brought closer to that of the electrode layers.

(3) Measurement of Particle Diameter

Secondary electron images and reflected electron images were captured with a scanning electron microscope at a magnification of ×30,000. The metal particles and the complex metal compound particles were distinguished from each other from the contrast of these images. Regarding the metal particles, 100 particles were randomly selected from the SEM images. The radii of circumcircles of the particles were defined as particle diameters. The same was true for the complex metal compound particles.

(Result)

Table 1 described below lists the characteristics of the materials used in the production methods in the examples (Examples 1-1 to 1-5) and the comparative examples (Comparative Examples 1-1 to 1-3) and the resulting metal-metal compound composite powder. In the "Coverage evaluation" column of Table 1, a capacitor with a coverage of 80% or more is expressed as "◯", a capacitor with a coverage of 79% to 70% is expressed as "Δ", and a capacitor with a coverage of 69% or less is expressed as "x".

TABLE 1

| | Synthesis method | Element added to metal salt solution in first step | Element added to reductant solution in first step | pH of metal salt solution | Element newly added in second step | Temperature (°C.) | Solvent | Reductant |
|---|---|---|---|---|---|---|---|---|
| Example 1-1 | method 1 | Ni, Ti | — | 1 | Ba | 80 | deionized water | hydrazine |
| Example 1-2 | method 1 | Ni, Ti | | 2 | Ba | 80 | deionized water | hydrazine |
| Example 1-3 | method 1 | Ni, Ti | | 5 | Ba | 80 | deionized water | hydrazine |
| Example 1-4 | method 1 | Ni, Ti, Zr | — | 2 | Ba, Ca | 80 | deionized water | hydrazine |
| Example 1-5 | method 1 | Ni, Ti | — | 2 | Ba | 80 | deionized water-ethanol (1:1) solution | hydrazine |
| Comparative Example 1-1 | method 2 | Ni | — | 5 | — | — | water | hydrazine |
| Comparative Example 1-2 | method 3 | Ni, Ti | Ba | — | — | | ethanol | hydrazine |
| Comparative Example 1-3 | method 1 | Ni, Ti | | 7 | Ba | 80 | deionized water | hydrazine |

| | Cu/Ni for adjusting particle diameter (ppm) | Metal species formed | Species of metal compound formed | Particle diameter of powder of composite of metal and complex metal compound (μm) | Particle diameter of complex metal compound (μm) | Molar ratio of complex metal compound to metal component (mol %) | Coverage (%) | Coverage evaluation |
|---|---|---|---|---|---|---|---|---|
| Example 1-1 | 10 | Ni | BaTiO$_3$ | 0.3 | 0.03 | 2 | 85 | ◯ |
| Example 1-2 | 10 | Ni | BaTiO$_3$ | 0.3 | 0.03 | 2 | 83 | ◯ |
| Example 1-3 | 10 | Ni | BaTiO$_3$ | 0.3 | 0.03 | 2 | 81 | ◯ |
| Example 1-4 | 10 | Ni | mixture of BaTiO$_3$ + CaZrO$_3$ | 0.3 | 0.03 | 1 (Ti0.5, Zr0.5) (Ca0.5, Ba0.5) | 83 | ◯ |
| Example 1-5 | 10 | Ni | BaTiO$_3$ | 0.3 | 0.03 | 2 | 83 | ◯ |
| Comparative Example 1-1 | 10 | — | — | 0.3 | — | 0 | 52 | X |
| Comparative Example 1-2 | 0 | Ni | BaTiO$_3$ | 0.3 | 0.03 | 2 | 67 | X |
| Comparative Example 1-3 | 10 | Ni | BaTiO$_3$ | 0.3 | 0.03 | 2 | 68 | X |

The results listed in Table 1 demonstrate that in each of Examples 1-1 to 1-5 in which method 1 according to the present invention is employed, a coverage of 70% or more is obtained.

In contrast, the multilayer ceramic capacitor produced with the powder prepared in Comparative Example 1-1 has a coverage of 52%. The reason for this is that in Comparative Example 1-1, Ti and Ba elements are not added to the solution in the step and thus the fine particles of a complex metal compound that functions to inhibit the sintering temperature are not formed.

The multilayer ceramic capacitor produced with the powder prepared in Comparative Example 1-2 has a coverage of 67%. This value is higher than the coverage of the multilayer ceramic capacitor in Comparative Example 1-1. The reason for this is that in Comparative Example 1-2, Ti and Ba elements are added to the solution in the step and the fine particles of the complex metal compound are formed. However, the coverage of the multilayer ceramic capacitor in Comparative Example 1-2 is lower than those of the multilayer ceramic capacitors in the examples. The reason for this is presumably that in Comparative Example 1-2, the fine particles of the complex metal compound formed are not uniformly dispersed in the metal powder. Specifically, in Comparative Example 1-2, the covering of the Ni powder with the metal compound and the formation of the complex metal compound from the metal compound are performed in the same step. Thus, a reaction to form the complex metal compound in the solution occurs before the arrangement of the metal compound in the Ni particles, failing to efficiently producing the metal powder containing the metal combined with the complex metal compound. Furthermore, the complex metal compound formed in reaction sites other than the vicinity of the Ni particles prevents the dielectric substance from being uniformly present on the surfaces of the Ni particles, thereby reducing the effect of inhibiting the sintering.

Comparative Example 1-3 differs from Examples 1-1 to 1-5 in that the metal salt solution does not have a pH of 5 or less in the first step. In the production methods in Examples 1-1 to 1-5, the pH is adjusted to 5 or less. Thus, the ions of Ti, which is a group 4 element, are stabilized, so that a compound containing the group 4 element is not deposited at a stage before mixing with the reductant solution. In Comparative Example 1-3, however, the pH is 7. Thus, the ions of Ti, which is a group 4 element, are not stabilized, so that a compound containing the group 4 element is deposited at the stage before mixing with the reductant solution. As a result, the ions of the metal of the group 4 element are not uniformly present in the solution. Therefore, the effect of inhibiting the sintering is reduced, compared with Examples 1-1 to 1-5.

Other examples of the present invention will be described below. In the examples described below, the molar ratios of complex metal compounds to metal components, the coverage, and the particle diameters were measured in the same measurement methods as in the examples (Examples 1-1 to 1-5) and the comparative examples described above.

Examples 2-1 to 2-7

Examples 2-1 to 2-7 of the present invention will be described below. In the first step in Example 1-2, preparations were performed in such a manner that the molar ratios (% by mole) of the complex metal compound to the metal component were 0.05%, 0.1%, 1%, 3%, 5%, 10%, and 15% by mole. These production methods corresponded to Examples 2-1 to 2-7. The amounts of the element newly added in the second step were adjusted so as to be larger than the molar amounts of the element added in the first step, thereby producing metal-complex metal compound composite powders. The resulting powders were washed and dried. Conductive pastes were produced with these dry powders, and then multilayer ceramic capacitors were produced. Table 2 lists materials used in Examples 2-1 to 2-7 and the characteristics of the resulting powders.

TABLE 2

| | Synthesis method | Element added to metal salt solution in first step | Element added to reductant solution in first step | pH of metal salt solution | Element newly added in second step | Temperature (° C.) | Solvent | Reductant |
|---|---|---|---|---|---|---|---|---|
| Example 2-1 | method 1 | Ni, Ti | — | 2 | Ba | 80 | deionized water | hydrazine |
| Example 2-2 | method 1 | Ni, Ti | — | 2 | Ba | 80 | deionized water | hydrazine |
| Example 2-3 | method 1 | Ni, Ti | — | 2 | Ba | 80 | deionized water | hydrazine |
| Example 2-4 | method 1 | Ni, Ti | — | 2 | Ba | 80 | deionized water | hydrazine |
| Example 2-5 | method 1 | Ni, Ti | — | 2 | Ba | 80 | deionized water | hydrazine |
| Example 2-6 | method 1 | Ni, Ti | — | 2 | Ba | 80 | deionized water | hydrazine |
| Example 2-7 | method 1 | Ni, Ti | — | 2 | Ba | 80 | deionized water | hydrazine |

TABLE 2-continued

|  | Cu/Ni for adjusting particle diameter (ppm) | Metal species formed | Species of metal compound formed | Particle diameter of powder of composite of metal and complex metal compound (μm) | Particle diameter of complex metal compound (μm) | Molar ratio of complex metal compound to metal component (mol %) | Coverage (%) | Coverage evaluation |
|---|---|---|---|---|---|---|---|---|
| Example 2-1 | 10 | Ni | BaTiO₃ | 0.3 | 0.03 | 0.05 | 75 | Δ |
| Example 2-2 | 10 | Ni | BaTiO₃ | 0.3 | 0.03 | 0.1 | 81 | ○ |
| Example 2-3 | 10 | Ni | BaTiO₃ | 0.3 | 0.03 | 1 | 86 | ○ |
| Example 2-4 | 10 | Ni | BaTiO₃ | 0.3 | 0.03 | 3 | 88 | ○ |
| Example 2-5 | 10 | Ni | BaTiO₃ | 0.3 | 0.03 | 5 | 84 | ○ |
| Example 2-6 | 10 | Ni | BaTiO₃ | 0.3 | 0.03 | 10 | 81 | ○ |
| Example 2-7 | 10 | Ni | BaTiO₃ | 0.3 | 0.03 | 15 | 74 | Δ |

The results described in Table 2 demonstrate that in each of the metal powders whose molar ratios of the complex metal compound to the metal component are 0.1% to 10% by mole, the coverage is higher than those in the cases of molar ratios of 0.05% and 15% by mole. In other words, when the molar ratio of the complex metal compound to the metal component is 0.1% to 10% by mole, the effect of inhibiting the sintering is enhanced.

Examples 3-1 to 3-4

Examples 3-1 to 3-4 of the present invention will be described below. Metal-complex metal compounds were synthesized in the same production method as in Example 1-2, except that Ag, Pd, Cu, and Ni+Cu were used as metal salts to be converted into metals in the first step. The resulting powders were washed and dried. The dry powders were used for the production of multilayer ceramic capacitors. Table 3 lists materials used in Examples 3-1 to 3-4 and the characteristics of the resulting powders.

The results described in Table 3 demonstrate that high coverage is obtained also in the cases where the metal elements are Ag, Pd, Cu, and Ni+Cu. Furthermore, the use of the conductive pastes prepared with such high-conductivity metals results in multilayer ceramic capacitors including electrodes having good conductivity.

Examples 4-1 to 4-9

Examples 4-1 to 4-9 of the present invention will be described below. Metal-complex metal compounds were synthesized in the same production method as in Example 1-2, except that in the first step, the reaction temperature was in the range of 30° C. to 400° C. and the reductants were changed to sodium borohydride, titanium trichloride, sodium hypophosphite, sodium phosphite, hydrogen gas, and polyhydric alcohols. The resulting powders were washed and dried. The dry powders were used for the production of multilayer ceramic capacitors. Table 4 lists materials used in Examples 4-1 to 4-9 and the characteristics of the resulting powders.

TABLE 3

|  | Synthesis method | Element added to metal salt solution in first step | Element added to reductant solution in first step | pH of metal salt solution | Element newly added in second step | Temperature (° C.) | Solvent | Reductant |
|---|---|---|---|---|---|---|---|---|
| Example 3-1 | method 1 | Ag, Ti | — | 2 | Ba | 80 | deionized water | hydrazine |
| Example 3-2 | method 1 | Pd, Ti | — | 2 | Ba | 80 | deionized water | hydrazine |
| Example 3-3 | method 1 | Cu, Ti | — | 2 | Ba | 80 | deionized water | hydrazine |
| Example 3-4 | method 1 | Ni, Cu, Ti | — | 2 | Ba | 80 | deionized water | hydrazine |

|  | Cu/Ni for adjusting particle diameter (ppm) | Metal species formed | Species of metal compound formed | Particle diameter of powder of composite of metal and complex metal compound (μm) | Particle diameter of complex metal compound (μm) | Molar ratio of complex metal compound to metal component (mol %) | Coverage (%) | Coverage evaluation |
|---|---|---|---|---|---|---|---|---|
| Example 3-1 | 0 | Ag | BaTiO₃ | 0.3 | 0.03 | 2 | 82 | ○ |
| Example 3-2 | 0 | Pd | BaTiO₃ | 0.3 | 0.03 | 2 | 90 | ○ |
| Example 3-3 | 0 | Cu | BaTiO₃ | 0.3 | 0.03 | 2 | 82 | ○ |
| Example 3-4 | 0 | Ni, Cu | BaTiO₃ | 0.3 | 0.03 | 2 | 86 | ○ |

TABLE 4

| | Synthesis method | Element added to metal salt solution in first step | Element added to reductant solution in first step | pH of metal salt solution | Element newly added in second step | Temperature (° C.) | Solvent | Reductant |
|---|---|---|---|---|---|---|---|---|
| Example 4-1 | method 1 | Ni, Ti | — | 2 | Ba | 30 | deionized water | sodium borohydride |
| Example 4-2 | method 1 | Ni, Ti | — | 2 | Ba | 40 | deionized water | sodium borohydride |
| Example 4-3 | method 1 | Ni, Ti | — | 2 | Ba | 80 | deionized water | titanium trichloride |
| Example 4-4 | method 1 | Ni, Ti | — | 2 | Ba | 80 | deionized water | sodium hypophosphite |
| Example 4-5 | method 1 | Ni, Ti | — | 2 | Ba | 80 | deionized water | sodium phosphite |
| Example 4-6 | method 1 | Ni, Ti | — | 2 | Ba | 120 | deionized water | hydrogen gas |
| Example 4-7 | method 1 | Ni, Ti | — | 2 | Ba | 200 | deionized water-ethylene glycol (1:1) solution | ethylene glycol |
| Example 4-8 | method 1 | Ni, Ti | — | 2 | Ba | 300 | deionized water-tetraethylene glycol (1:1) solution | tetraethylene glycol |
| Example 4-9 | method 1 | Ni, Ti | — | 2 | Ba | 400 | deionized water-tetraethylene glycol (1:1) solution | tetraethylene glycol |

| | Cu/Ni for adjusting particle diameter (ppm) | Metal species formed | Species of metal compound formed | Particle diameter of powder of composite of metal and complex metal compound (μm) | Particle diameter of complex metal compound (μm) | Molar ratio of complex metal compound to metal component (mol %) | Coverage (%) | Coverage evaluation |
|---|---|---|---|---|---|---|---|---|
| Example 4-1 | 10 | Ni | BaTiO$_3$ | 0.1 | 0.03 | 2 | 77 | Δ |
| Example 4-2 | 10 | Ni | BaTiO$_3$ | 0.1 | 0.03 | 2 | 82 | ○ |
| Example 4-3 | 10 | Ni | BaTiO$_3$ | 0.3 | 0.03 | 2 | 84 | ○ |
| Example 4-4 | 10 | Ni | BaTiO$_3$ | 0.3 | 0.03 | 2 | 82 | ○ |
| Example 4-5 | 10 | Ni | BaTiO$_3$ | 0.3 | 0.03 | 2 | 84 | ○ |
| Example 4-6 | 10 | Ni | BaTiO$_3$ | 0.3 | 0.03 | 2 | 86 | ○ |
| Example 4-7 | 10 | Ni | BaTiO$_3$ | 0.2 | 0.1 | 2 | 86 | ○ |
| Example 4-8 | 10 | Ni | BaTiO$_3$ | 0.2 | 0.1 | 2 | 84 | ○ |
| Example 4-9 | 10 | Ni | BaTiO$_3$ | 0.2 | 0.1 | 2 | 78 | Δ |

The results described in Table 4 demonstrate that also in the cases where any of sodium borohydride, titanium trichloride, sodium hypophosphite, sodium phosphite, hydrogen gas, and polyhydric alcohols is used as the reductant, a coverage of 70% or more is provided at a reaction temperature of 400° C. or lower. To provide a high coverage of 80% or more, the reaction temperature is preferably in the range of 40° C. to 300° C.

Examples 5-1 to 5-3

Examples 5-1 to 5-3 of the present invention will be described below. Metal-complex metal compounds were synthesized in the same production method as in Example 1-2, except that the elements newly added in the second step were changed to Mg, Sr, and Ca. The resulting compound powders were washed and dried. The dry powders were used for the production of the multilayer ceramic capacitors. Table 5 lists materials used in Examples 5-1 to 5-3 and the characteristics of the resulting powders.

TABLE 5

| | Synthesis method | Element added to metal salt solution in first step | Element added to reductant solution in first step | pH of metal salt solution | Element newly added in second step | Temperature (° C.) | Solvent | Reductant |
|---|---|---|---|---|---|---|---|---|
| Example 5-1 | method 1 | Ni, Ti | — | 2 | Mg | 80 | deionized water | hydrazine |
| Example 5-2 | method 1 | Ni, Ti | — | 2 | Sr | 80 | deionized water | hydrazine |
| Example 5-3 | method 1 | Ni, Ti | — | 2 | Ca | 80 | deionized water | hydrazine |

| | Cu/Ni for adjusting particle diameter (ppm) | Metal species formed | Species of metal compound formed | Particle diameter of powder of composite of metal and complex metal compound (μm) | Particle diameter of complex metal compound (μm) | Molar ratio of complex metal compound to metal component (mol %) | Coverage (%) | Coverage evaluation |
|---|---|---|---|---|---|---|---|---|
| Example 5-1 | 10 | Ni | MgTiO$_3$ | 0.3 | 0.03 | 2 | 82 | ○ |
| Example 5-2 | 10 | Ni | SrTiO$_3$ | 0.3 | 0.03 | 2 | 84 | ○ |
| Example 5-3 | 10 | Ni | CaTiO$_3$ | 0.3 | 0.03 | 2 | 83 | ○ |

The results described in Table 5 demonstrate that also in the cases where the complex metal compounds formed in the second step are MgTiO$_3$, SrTiO$_3$, and CaTiO$_3$, high coverage is provided. There are multilayer ceramic capacitors having various dielectric compositions. It is thus possible to select the types of complex metal compounds contained in the metal powders used for the formation of the electrode layers, depending on their compositions.

Examples 6-1 to 6-5

Examples 6-1 to 6-5 of the present invention will be described below. Like Example 1-2, in order to adjust the particle diameter, a 0.1% by mole aqueous solution of copper(II) chloride was added in such a manner that Cu/Ni (% by weight) was in the range of 0 to 1000 ppm, thereby adjusting the particle diameter to 0.01 to 1 μm. To produce particles with a particle diameter of 1 μm, the synthesis was performed with nickel carbonate having an equimolar amount of Ni in Example 1-2. The particles were produced in the same production method. The particle diameters of the particles were measured. The resulting powders were used for the production of multilayer ceramic capacitors. Table 6 lists materials used in Examples 6-1 to 6-5 and the characteristics of the resulting powders.

TABLE 6

| | Synthesis method | Element added to metal salt solution in first step | Element added to reductant solution in first step | pH of metal salt solution | Element newly added in second step | Temperature (° C.) | Solvent | Reductant |
|---|---|---|---|---|---|---|---|---|
| Example 6-1 | method 1 | Ni, Ti | — | 2 | Ba | 80 | deionized water | hydrazine |
| Example 6-2 | method 1 | Ni, Ti | — | 2 | Ba | 80 | deionized water | hydrazine |
| Example 6-3 | method 1 | Ni, Ti | — | 2 | Ba | 80 | deionized water | hydrazine |
| Example 6-4 | method 1 | Ni, Cu, Ti | — | 2 | Ba | 80 | deionized water | hydrazine |
| Example 6-5 | method 1 | Ni, Ti | — | 2 | Ba | 80 | deionized water | sodium borohydride |

| | Cu/Ni for adjusting particle diameter (ppm) | Metal species formed | Species of metal compound formed | Particle diameter of powder of composite of metal and complex metal compound (μm) | Particle diameter of complex metal compound (μm) | Molar ratio of complex metal compound to metal component (mol %) | Coverage (%) | Coverage evaluation |
|---|---|---|---|---|---|---|---|---|
| Example 6-1 | 0 | Ni | BaTiO$_3$ | 1 | 0.2 | 2 | 84 | ○ |
| Example 6-2 | 0 | Ni | BaTiO$_3$ | 0.5 | 0.1 | 2 | 82 | ○ |
| Example 6-3 | 50 | Ni | BaTiO$_3$ | 0.1 | 0.01 | 2 | 85 | ○ |

TABLE 6-continued

| | | | | | | | | |
|---|---|---|---|---|---|---|---|---|
| Example 6-4 | 1000 | Ni, Cu | BaTiO$_3$ | 0.05 | 0.01 | 2 | 83 | ○ |
| Example 6-5 | 0 | Ni | BaTiO$_3$ | 0.01 | 0.005 | 2 | 81 | ○ |

The results described in Table 6 demonstrate that also in the cases of the metal powders having particle diameters different from about 0.3 μm, improvement in coverage due to the inhibition of the sintering is observed. Thus, the metal powder produced in the present invention may be used for various electronic components in addition to electrode layers of multilayer ceramic capacitors.

Examples 7-1 to 7-27

Examples 7-1 to 7-27 of the present invention will be described below. Like Example 1-2, a solution containing a compound dissolved therein, the compound containing at least one element selected from Mg, Ca, Sr, Y, La, Nd, Sm, Eu, Gd, Tb, Dy, Ho, Er, Yb, Sc, V, Nb, Ta, Cr, Mo, W, Mn, Fe, Ru, Co, Al, Ga, and Si was added to the metal salt solution in the first step, the reductant solution in the first step, or the metal compound or the metal compound solution newly added in the second step. Here, the method in which the solution containing the element is added to the metal salt solution in the first step is expressed as "method 4" in the "Synthesis method" column in Table 7. The method in which the solution containing the element is added to the reductant solution in the first step is expressed as "method 5". The method in which the solution containing the element is added to the metal compound or the metal compound solution newly added in the second step is expressed as "method 6" in the "Synthesis method" column in Table 7.

The amount of at least one element selected from Mg, Ca, Sr, Y, La, Nd, Sm, Eu, Gd, Tb, Dy, Ho, Er, Yb, Sc, V, Nb, Ta, Cr, Mo, W, Mn, Fe, Ru, Co, Al, Ga, and Si was adjusted to 0.02% by mole with respect to the molar amount of metal element formed. Metal-complex metal compounds were synthesized under the foregoing conditions. The resulting powders were washed and dried. The dry powders were used for the production of the multilayer ceramic capacitors. Table 7 lists materials used in Examples 7-1 to 7-27 and the characteristics of the resulting powders.

TABLE 7

| | Synthesis method | Element added to metal salt solution in first step | Element added to reductant solution in first step | pH of metal salt solution | Element newly added in second step | Temperature (° C.) | Solvent | Reductant |
|---|---|---|---|---|---|---|---|---|
| Example 7-1 | method 4 | Ni, Ti, Mg | — | 2 | Ba | 80 | deionized water | hydrazine |
| Example 7-2 | method 4 | Ni, Ti, Dy | — | 2 | Ba | 80 | deionized water | hydrazine |
| Example 7-3 | method 4 | Ni, Ti, Gd | — | 2 | Ba | 80 | deionized water | hydrazine |
| Example 7-4 | method 4 | Ni, Ti, Ho | — | 2 | Ba | 80 | deionized water | hydrazine |
| Example 7-5 | method 4 | Ni, Ti, Sc | — | 2 | Ba | 80 | deionized water | hydrazine |
| Example 7-6 | method 4 | Ni, Ti, Y | — | 2 | Ba | 80 | deionized water | hydrazine |
| Example 7-7 | method 4 | Ni, Ti, Zr | — | 2 | Ba | 80 | deionized water | hydrazine |
| Example 7-8 | method 4 | Ni, Ti, V | — | 2 | Ba | 80 | deionized water | hydrazine |
| Example 7-9 | method 4 | Ni, Ti, Nb | — | 2 | Ba | 80 | deionized water | hydrazine |
| Example 7-10 | method 4 | Ni, Ti, Ta | — | 2 | Ba | 80 | deionized water | hydrazine |
| Example 7-11 | method 4 | Ni, Ti, Cr | — | 2 | Ba | 80 | deionized water | hydrazine |
| Example 7-12 | method 4 | Ni, Ti, Mo | — | 2 | Ba | 80 | deionized water | hydrazine |
| Example 7-13 | method 4 | Ni, Ti, W | — | 2 | Ba | 80 | deionized water | hydrazine |
| Example 7-14 | method 4 | Ni, Ti, Mn | — | 2 | Ba | 80 | deionized water | hydrazine |
| Example 7-15 | method 4 | Ni, Ti, Fe | — | 2 | Ba | 80 | deionized water | hydrazine |
| Example 7-16 | method 4 | Ni, Ti, Ru | — | 2 | Ba | 80 | deionized water | hydrazine |
| Example 7-17 | method 4 | Ni, Ti, Co | — | 2 | Ba | 80 | deionized water | hydrazine |
| Example 7-18 | method 4 | Ni, Ti, Al | — | 2 | Ba | 80 | deionized water | hydrazine |
| Example 7-19 | method 4 | Ni, Ti, Ga | — | 2 | Ba | 80 | deionized water | hydrazine |
| Example 7-20 | method 4 | Ni, Ti, Si | — | 2 | Ba | 80 | deionized water | hydrazine |
| Example 7-21 | method 4 | Ni, Ti | Y | 2 | Ba | 80 | deionized water | hydrazine |
| Example 7-22 | method 4 | Ni, Ti | — | 2 | Ba, Y | 80 | deionized water | hydrazine |
| Example 7-23 | method 4 | Ni, Ti, Y | Y | 2 | Ba, Y | 80 | deionized water | hydrazine |
| Example 7-24 | method 4 | Ni, Ti | Mg, Y | 2 | Ba | 80 | deionized water | hydrazine |
| Example 7-25 | method 4 | Ni, Ti, Y, Zr | Mg | 2 | Ba | 80 | deionized water | hydrazine |
| Example 7-26 | method 4 | Ni, Ti, Y, Mg | — | 2 | Ba | 80 | deionized water | hydrazine |
| Example 7-27 | method 4 | Ni, Ti, Dy, Mg | — | 2 | Ba | 80 | deionized water | hydrazine |

| | Cu/Ni for adjusting particle diameter (ppm) | Metal species formed | Species of metal compound formed | Particle diameter of powder of composite of metal and complex metal compound (μm) | Particle diameter of complex metal compound (μm) | Molar ratio of complex metal compound to metal component (mol %) | Coverage (%) | Coverage evaluation |
|---|---|---|---|---|---|---|---|---|
| Example 7-1 | 10 | Ni | BaTiO$_3$ | 0.3 | 0.03 | 2 | 86 | ○ |
| Example 7-2 | 10 | Ni | BaTiO$_3$ | 0.3 | 0.03 | 2 | 88 | ○ |
| Example 7-3 | 10 | Ni | BaTiO$_3$ | 0.3 | 0.03 | 2 | 89 | ○ |
| Example 7-4 | 10 | Ni | BaTiO$_3$ | 0.3 | 0.03 | 2 | 88 | ○ |

TABLE 7-continued

| | | | | | | | | |
|---|---|---|---|---|---|---|---|---|
| Example 7-5 | 10 | Ni | BaTiO$_3$ | 0.3 | 0.03 | 2 | 83 | ○ |
| Example 7-6 | 10 | Ni | BaTiO$_3$ | 0.3 | 0.03 | 2 | 86 | ○ |
| Example 7-7 | 10 | Ni | BaTiO$_3$ | 0.3 | 0.03 | 2 | 88 | ○ |
| Example 7-8 | 10 | Ni | BaTiO$_3$ | 0.3 | 0.03 | 2 | 81 | ○ |
| Example 7-9 | 10 | Ni | BaTiO$_3$ | 0.3 | 0.03 | 2 | 84 | ○ |
| Example 7-10 | 10 | Ni | BaTiO$_3$ | 0.3 | 0.03 | 2 | 88 | ○ |
| Example 7-11 | 10 | Ni | BaTiO$_3$ | 0.3 | 0.03 | 2 | 90 | ○ |
| Example 7-12 | 10 | Ni | BaTiO$_3$ | 0.3 | 0.03 | 2 | 88 | ○ |
| Example 7-13 | 10 | Ni | BaTiO$_3$ | 0.3 | 0.03 | 2 | 89 | ○ |
| Example 7-14 | 10 | Ni | BaTiO$_3$ | 0.3 | 0.03 | 2 | 83 | ○ |
| Example 7-15 | 10 | Ni | BaTiO$_3$ | 0.3 | 0.03 | 2 | 84 | ○ |
| Example 7-16 | 10 | Ni | BaTiO$_3$ | 0.3 | 0.03 | 2 | 89 | ○ |
| Example 7-17 | 10 | Ni | BaTiO$_3$ | 0.3 | 0.03 | 2 | 82 | ○ |
| Example 7-18 | 10 | Ni | BaTiO$_3$ | 0.3 | 0.03 | 2 | 87 | ○ |
| Example 7-19 | 10 | Ni | BaTiO$_3$ | 0.3 | 0.03 | 2 | 85 | ○ |
| Example 7-20 | 10 | Ni | BaTiO$_3$ | 0.3 | 0.03 | 2 | 82 | ○ |
| Example 7-21 | 10 | Ni | BaTiO$_3$ | 0.3 | 0.03 | 2 | 85 | ○ |
| Example 7-22 | 10 | Ni | BaTiO$_3$ | 0.3 | 0.03 | 2 | 87 | ○ |
| Example 7-23 | 10 | Ni | BaTiO$_3$ | 0.3 | 0.03 | 2 | 86 | ○ |
| Example 7-24 | 10 | Ni | BaTiO$_3$ | 0.3 | 0.03 | 2 | 91 | ○ |
| Example 7-25 | 10 | Ni | BaTiO$_3$ | 0.3 | 0.03 | 2 | 93 | ○ |
| Example 7-26 | 10 | Ni | BaTiO$_3$ | 0.3 | 0.03 | 2 | 91 | ○ |
| Example 7-27 | 10 | Ni | BaTiO$_3$ | 0.3 | 0.03 | 2 | 92 | ○ |

The results described in Table 7 demonstrate that the addition of the foregoing elements results in the metal powders containing the metal combined with the complex metal compound that is uniformly present on each metal particle. The complex metal compound is uniformly dispersed in the each of the metal powders, thus inhibiting a reduction in coverage.

The production method according to Examples 7 has the following advantages in addition to the inhibition of the reduction in coverage. That is, dielectric layers of multilayer ceramic capacitors contain additives, such as rare-earth elements, in order to improve the characteristics of electronic components. Meanwhile, complex metal compound components in electrode layers of multilayer ceramic capacitors can migrate to dielectric layers during sintering to cause the deviation of the dielectric composition, thereby reducing the characteristics as electronic components. However, in the production methods according to the present invention, it is possible to maintain the characteristics of the electronic component by changing the species and the amount of the complex metal compound even when composition deviation occurs after firing. Furthermore, the complex metal compound contains the rare-earth element, so that the sintering temperature of the complex metal compound is increased, thereby improving the effect of inhibiting the sintering and resulting in high coverage.

In Examples 7-1 to 7-27, regarding the addition method of Mg, Ca, Sr, Y, La, Nd, Sm, Eu, Gd, Tb, Dy, Ho, Er, Yb, Sc, V, Nb, Ta, Cr, Mo, W, Mn, Fe, Ru, Co, Al, Ga, and Si, they may be added in the form of a compound slurry rather than the solution. The compound containing at least one element selected from Mg, Ca, Sr, Y, La, Nd, Sm, Eu, Gd, Tb, Dy, Ho, Er, Yb, Sc, V, Nb, Ta, Cr, Mo, W, Mn, Fe, Ru, Co, Al, Ga, and Si may be any of a chloride, a sulfide, an oxide, a hydroxide, a carbonate, and a sulfate.

While the examples of the present invention have been described above, the present invention is not limited to the foregoing examples.

The solvent used in the first step may not be deionized water alone and only needs to be a solvent in which the metal salt to be converted into the metal and the compound containing the metal element to be converted into the metal compound can be dissolved. As the solvent, deionized water, alcohols, and polyols are preferably used. Specifically, deionized water, alcohol-based solvents, such as methanol, ethanol, 2-propanol, 1-propanol, and 1-butanol, and polyols, such as ethylene glycol, glycerol, diethylene glycol, triethylene glycol, tetraethylene glycol, dipropylene glycol, tripropylene glycol, and tetrapropylene glycol, are preferred. A mixture of two or more solvents may be used as the solvent. At least one of the solvents mixed only needs to be deionized water, alcohol, or polyol. The remaining solvent is not limited to alcohol or polyol.

The metal compound formed may also be an oxalate, a carbonate, or the like. The metal compound formed in the first step may be in an amorphous state. The complex metal compound formed in the second step need not be a complete crystal and may be a mixture in which the metal compound deposited in the first step and the metal compound added in the second step are mixed on a nanometer scale. A material for a multilayer ceramic capacitor is preferably an oxide in view of the influence of impurities and thus is preferably converted into an oxide.

The washing after the first step is preferably performed in order to reduce impurities. The solvent used for the washing is not limited to deionized water and only needs to be separable by decantation or the like. The solvent used in the synthesis of the metal is preferably used. The washing operation may be performed by a method, for example, centrifugation or separation with a filter, without being limited to decantation. Any method by which the powder can be separated from the solvent in the solution may be employed.

REFERENCE SIGNS LIST 10 metal salt solution
12 metal ion
14 metal ion of group 4 element
20 reductant solution
30 slurry prepared in first step
32 metal
34 metal compound
36 metal powder containing metal combined with metal compound
42 metal ion added in second step
52 complex metal compound 54 metal powder containing metal combined with complex metal compound
112 metal
114, 116 metal alkoxide
132 metal powder containing metal combined with complex metal compound
134 complex metal compound uncombined with metal

The invention claimed is:

1. A method for producing a metal powder, the method comprising:
preparing a first solution that contains at least one first metal element and at least one group 4 element different from the first metal element;
adjusting the solution to have a pH of 5 or less;
mixing the first solution with a reductant solution to coprecipitate a metal and a metal compound containing the at least one group 4 element to produce a slurry that contains the metal combined with the metal compound; and
adding at least one second metal element to the slurry to convert the metal compound into a complex metal compound that includes the first metal element and the second metal element and so as to produce a metal powder containing the metal combined with the complex metal compound.

2. The method for producing a metal powder according to claim 1, wherein the steps of preparing the first solution, adjusting the solution to have a pH of 5 or less, and mixing the first solution with the reductant solution are carried out in a first step, and the step of adding the at least one second metal element to the slurry is carried out in a second step.

3. The method for producing a metal powder according to claim 1, further comprising preparing a second solution or a powder containing the at least one second metal element and adding the second solution or the powder to the slurry.

4. The method for producing a metal powder according to claim 3, wherein the at least one second metal element is selected from Mg, Ca, Sr, and Ba.

5. The method for producing a metal powder according to claim 3, further comprising adding at least one third element selected from Mg, Ca, Sr, Y, La, Nd, Sm, Eu, Gd, Tb, Dy, Ho, Er, Yb, Sc, V, Nb, Ta, Cr, Mo, W, Mn, Fe, Ru, Co, Al, Ga, and Si to the second solution or the powder containing the at least one second metal element.

6. The method for producing a metal powder according to claim 1, wherein a molar ratio of the complex metal compound to the metal in the metal powder is 0.1% by mole to 10% by mole.

7. The method for producing a metal powder according to claim 1, wherein the least one first metal element is selected from Ni, Ag, Cu, and Pd.

8. The method for producing a metal powder according to claim 1, wherein the reductant solution contains at least one reductant selected from sodium borohydride, titanium trichloride, hydrazine, sodium hypophosphite, sodium phosphite, aldehyde, ascorbic acid, citric acid, hydrogen gas, and alcohols.

9. The method for producing a metal powder according to claim 1, wherein the at least one second metal element is selected from Mg, Ca, Sr, and Ba.

10. The method for producing a metal powder according to claim 1, wherein a reaction temperature when adding the at least one second metal element to the slurry to convert the metal compound into the complex metal compound is in a range of 40° C. to 300° C.

11. The method for producing a metal powder according to claim 1, further comprising controlling the production of the metal powder such that the metal powder has a particle diameter of 1 μm or less.

12. The method for producing a metal powder according to claim 11, wherein the adding of the at least one second metal element to the slurry to convert the metal compound into the complex metal compound is controlled such that the complex metal compound has a particle diameter of 0.2 μm or less.

13. The method for producing a metal powder according to claim 1, wherein the adding of the at least one second metal element to the slurry to convert the metal compound into the complex metal compound is controlled such that the complex metal compound has a particle diameter of 0.2 μm or less.

14. The method for producing a metal powder according to claim 1, further comprising adding at least one third element selected from Mg, Ca, Sr, Y, La, Nd, Sm, Eu, Gd, Tb, Dy, Ho, Er, Yb, Sc, V, Nb, Ta, Cr, Mo, W, Mn, Fe, Ru, Co, Al, Ga, and Si.

15. The method for producing a metal powder according to claim 14, wherein the at least one third element is added to the first solution.

16. The method for producing a metal powder according to claim 14, wherein the at least one third element is added to the reductant solution.

17. The method for producing a metal powder according to claim 14, wherein the at least one third element is added to the slurry.

* * * * *